(12) United States Patent
Sawanishi et al.

(10) Patent No.: US 10,773,334 B2
(45) Date of Patent: Sep. 15, 2020

(54) RESISTANCE SPOT WELDING METHOD

(71) Applicant: JFE STEEL CORPORATION, Chiyoda-ku, Tokyo (JP)

(72) Inventors: Chikaumi Sawanishi, Tokyo (JP); Hiroshi Matsuda, Tokyo (JP); Rinsei Ikeda, Tokyo (JP)

(73) Assignee: JFE STEEL CORPORATION, Chiyoda-ku, Tokyo (JP)

( * ) Notice: Subject to any disclaimer, the term of this patent is extended or adjusted under 35 U.S.C. 154(b) by 465 days.

(21) Appl. No.: 15/566,344

(22) PCT Filed: Apr. 15, 2016

(86) PCT No.: PCT/JP2016/002056
§ 371 (c)(1),
(2) Date: Oct. 13, 2017

(87) PCT Pub. No.: WO2016/174842
PCT Pub. Date: Nov. 3, 2016

(65) Prior Publication Data
US 2018/0281102 A1      Oct. 4, 2018

(30) Foreign Application Priority Data

Apr. 27, 2015  (JP) .................................. 2015-090519

(51) Int. Cl.
*B23K 11/11* (2006.01)
*B23K 11/25* (2006.01)
(Continued)

(52) U.S. Cl.
CPC ............. *B23K 11/115* (2013.01); *B23K 11/11* (2013.01); *B23K 11/25* (2013.01); *B23K 11/255* (2013.01);
(Continued)

(58) Field of Classification Search
CPC ........ B23K 11/115; B23K 11/11; B23K 11/25
(Continued)

(56) References Cited

U.S. PATENT DOCUMENTS 6,057,523 A    5/2000   Fujii et al.
6,130,396 A    10/2000  Hasegawa et al.
(Continued)

FOREIGN PATENT DOCUMENTS

CN    102581459 A    7/2012
CN    103994821 A    8/2014
(Continued)

OTHER PUBLICATIONS

Machine Translation of WO2014136507 to English (Year: 2020).*
(Continued)

*Primary Examiner* — Tu B Hoang
*Assistant Examiner* — Thomas J Ward
(74) *Attorney, Agent, or Firm* — Kenja IP Law PC

(57) ABSTRACT

A stored time variation curve and cumulative amount of heat generated of each step are each used as a target. In the case where a time variation of an instantaneous amount of heat generated per unit volume differs from the time variation curve in any of the steps, a current passage amount is controlled in order to compensate for the difference within a remaining welding time in the step so that a cumulative amount of heat generated per unit volume in actual welding matches the stored cumulative amount of heat generated in the test welding. Further, in the case where expulsion is detected in any of the steps, then in subsequent welding, the cumulative amount of heat generated per unit volume used as the target is reduced, and the current passage amount is adjusted in accordance with the reduced cumulative amount of heat generated per unit volume.

2 Claims, 3 Drawing Sheets

(51) Int. Cl.
  *B23K 103/04* (2006.01)
  *B23K 101/18* (2006.01)
(52) U.S. Cl.
  CPC .......... *B23K 11/256* (2013.01); *B23K 11/257* (2013.01); *B23K 11/258* (2013.01); *B23K 2101/18* (2018.08); *B23K 2103/04* (2018.08)
(58) Field of Classification Search
  USPC .............................. 219/91.2, 109, 110, 117.1
  See application file for complete search history.

(56) References Cited

U.S. PATENT DOCUMENTS

| | | | |
|---|---|---|---|
| 2007/0119823 A1* | 5/2007 | Filev | B23K 11/252 219/110 |
| 2016/0008913 A1 | 1/2016 | Okita et al. | |
| 2016/0008914 A1 | 1/2016 | Okita et al. | |
| 2016/0236294 A1 | 8/2016 | Sawanishi et al. | |

FOREIGN PATENT DOCUMENTS

| | | | | |
|---|---|---|---|---|
| JP | H05337655 A | | 12/1993 | |
| JP | H09216071 A | | 8/1997 | |
| JP | H1094883 A | | 4/1998 | |
| JP | H1133743 A | | 2/1999 | |
| JP | 2004058153 A | | 2/2004 | |
| JP | WO2014136507 | * | 9/2014 | ............. B23K 11/11 |
| WO | 2014136507 A1 | | 9/2014 | |
| WO | 2014156290 A1 | | 10/2014 | |
| WO | 2015049998 A1 | | 4/2015 | |

OTHER PUBLICATIONS

Mar. 4, 2019, Office Action issued by the State Intellectual Property Office in the corresponding Chinese Patent Application No. 201680022510.6 with English language search report.

Apr. 18, 2018, Extended European Search Report issued by the European Patent Office in the corresponding European Patent Application No. 16786122.8.

May 17, 2016, International Search Report issued in the International Patent Application No. PCT/JP2016/002056.

* cited by examiner

RESISTANCE SPOT WELDING METHOD

TECHNICAL FIELD

The disclosure relates to a resistance spot welding method that can ensure an appropriate nugget diameter even when expulsion (splash) occurs, by an adaptive control welding technique.

BACKGROUND

Steel sheets overlapped on each other are typically joined by resistance spot welding which is one type of lap resistance welding.

Resistance spot welding is a method of squeezing two or more overlapping steel sheets by a pair of electrodes from above and below and, while applying an electrode force, passing a high welding current between the upper and lower electrodes for a short time to join the steel sheets. Heat generated from the resistance to the flow of the high welding current is used to obtain a spot weld. The spot weld is called a nugget, and results from the overlapping steel sheets melting and solidifying at their contact portion when the current flows through the steel sheets. The steel sheets are spot-joined by this nugget.

For good weld quality, it is important to form the nugget with a diameter in an appropriate range. The nugget diameter depends on the welding condition such as welding current, welding time, electrode shape, and electrode force. To achieve an appropriate nugget diameter, the welding condition needs to be set appropriately according to the parts-to-be-welded condition such as the material, sheet thickness, and number of overlapping sheets of the parts to be welded.

In vehicle manufacturing, for example, spot welding is performed at several thousand points per vehicle, and parts to be welded (workpieces) conveyed one after another need to be welded. Here, if the parts-to-be-welded condition such as the material, sheet thickness, and number of overlapping sheets of the parts to be welded is the same at each welding location, the same welding condition such as welding current, welding time, and electrode force can be used to obtain the same nugget diameter. In continuous welding, however, the contact surfaces of the electrodes with the parts to be welded wear gradually and the contact areas widen gradually as compared with the initial state. When the same welding current as in the initial state is passed in such a state where the contact areas have widened, the current density in the parts to be welded decreases and the temperature rise of the weld drops, which leads to a smaller nugget diameter. Accordingly, the electrodes are dressed or replaced every several hundred to several thousand welding points, to prevent the electrode tip diameter from increasing excessively.

A resistance welding device having a function (stepper function) of increasing the welding current after a predetermined number of welding operations to compensate for a decrease in current density associated with electrode wear has been conventionally used, too. To use the stepper function, the aforementioned welding current change pattern needs to be set appropriately beforehand. However, considerable time and cost are required to derive the welding current change patterns corresponding to numerous parts-to-be-welded conditions and welding conditions through tests and the like. Besides, since the state of progress of electrode wear varies in actual work, the welding current change pattern set beforehand may not always be appropriate.

In addition, in the case where disturbances are present during welding such as when a point that has already been welded (existing weld) is present near the current welding point or when the parts to be welded have significant surface roughness and a contact point of the parts to be welded is present near the welding point, part of the current is shunted into such an existing weld or contact point during welding. In this state, even when welding is performed under a predetermined condition, the current density at the position to be welded which is directly above and below the electrodes decreases, and so a nugget of a required diameter cannot be obtained. To compensate for such an insufficient amount of heat generated and obtain a nugget of a required diameter, a high welding current needs to be set beforehand.

Moreover, in the case where the surroundings of the welding point are strongly restrained due to surface roughness, member shape, etc., a larger sheet gap between the steel sheets causes a smaller contact diameter of the steel sheets, which may hinder the obtainment of a nugget of a required diameter or facilitate expulsion.

The following techniques have been proposed to solve the problems stated above.

For example, JP H9-216071 A (PTL 1) describes a control unit of a resistance welder that compares an estimated temperature distribution of a weld and a target nugget and controls the output of the welder to obtain the set nugget.

JP H10-94883 A (PTL 2) describes a welding condition control method for a resistance welder of detecting the welding current and the voltage between tips, simulating a weld through heat transfer calculation, and estimating the nugget formation state to achieve good welding.

JP H11-33743 A (PTL 3) describes a welding system that calculates, from the sheet thickness of parts to be welded and the welding time, the cumulative amount of heat generated per unit volume with which good welding of the parts to be welded is possible, and adjusts the welding current or voltage to generate the calculated amount of heat per unit volume and per unit time, in order to achieve good welding regardless of the type of the parts to be welded or the wear state of the electrodes.

JP 2004-58153 A (PTL 4) describes a welding method of calculating a curve that takes the value of the power and the current or the square of the current per half cycle during current passage, determining the nugget formation state based on the change of the curve, and either adjusting the current or the electrode force in the subsequent cycles or terminating the current.

CITATION LIST

Patent Literatures

PTL 1: JP H9-216071 A
PTL 2: JP H10-94883 A
PTL 3: JP H11-33743 A
PTL 4: JP 2004-58153 A

SUMMARY

Technical Problem

However, the techniques described in PTL 1 and PTL 2 need complex calculation to estimate the nugget temperature based on a heat transfer model (heat transfer simulation).

This requires a welding control unit that is not only complex in structure but also expensive.

The resistance spot welding method described in PTL 3 enables relatively good welding even if the electrodes wear to a certain extent, by adjusting the cumulative amount of heat generated to the target value. However, in the case where the set parts-to-be-welded condition and the actual parts-to-be-welded condition are significantly different, e.g. in the case where disturbances such as the aforementioned existing weld or sheet gap between the steel sheets are present nearby and significantly affect the welding point, even when the final cumulative amount of heat generated can be adjusted to the target value, the heat generation and current patterns, namely, the time variations of the temperature distribution and current density distribution of the weld, deviate significantly from the target patterns for obtaining a good weld. This leads to a failure to obtain a required nugget diameter, or expulsion.

For example, when a contact point of the parts to be welded is present near the welding point and there is a large sheet gap between the parts to be welded, the resistance between electrodes increases, which causes a decrease in current and makes it impossible to ensure the nugget diameter.

The welding method described in PTL 4 monitors the change of the curve of the current increase/decrease process per half cycle. Such a welding method is supposed to be used in AC-powered welding, and cannot be used in DC-powered welding. Besides, although PTL 4 mentions the adjustment of any of the current, electrode force, and welding time as means for suppressing expulsion, PTL 4 fails to explain the necessity to adjust each of these parameters.

Further, while the techniques disclosed in PTL 1 to PTL 4 are all effective to some extent for the change in the case where the electrode tips wear, these techniques do not take into consideration the situations where the effect of current shunting or a sheet gap is significant because of, for example, the presence of an existing weld nearby or the presence of a contact point due to surface roughness between steel sheets. Hence, adaptive control does not actually function in some cases.

Particularly when welding a sheet combination for which an appropriate welding condition is very limited, such as a sheet combination in which an outer portion (thin sheet) with small sheet thickness is located on the outer side and an inner portion and a reinforcement (thick sheets) with large sheet thickness are located on the inner side, expulsion tends to occur during welding due to disturbances. Once expulsion has occurred, appropriate control cannot be performed subsequently.

It could be helpful to provide a resistance spot welding method that, even when the effects of disturbances such as a sheet gap or current shunting are significant and expulsion occurs during welding due to such disturbances, can obtain a nugget of an appropriate diameter by preventing further expulsion.

Solution to Problem

We repeatedly conducted intensive study, and discovered the following:

(1) In the case where the condition for obtaining an appropriate nugget diameter varies due to disturbances, the following process is effective: In test welding, the amount of heat generated per unit volume and per unit time with which the parts to be welded can be welded favorably is calculated from the sheet thickness of the parts to be welded and the welding time. In subsequent actual welding, adaptive control welding of adjusting the current passage amount to generate the calculated amount of heat generated per unit volume and per unit time is performed.

(2) Before and in an initial stage of resistance spot welding, the resistance between the metal sheets at the welding point is high, and the current passage diameter has not been secured yet. Accordingly, for example when a contact point of the parts to be welded, such as an existing weld, is present near the welding point and there is a large sheet gap between the parts to be welded, current shunting to the contact point occurs and the contact diameter of the parts to be welded at the welding point decreases, as a result of which the resistance between electrodes increases depending on the sheet combination. This causes the device to falsely recognize that the cumulative amount of heat generated at the welding point is excessively large. The current under adaptive control is accordingly decreased, resulting in a different heat generation pattern from that of the test welding. This makes it impossible to obtain the required nugget diameter. Moreover, in the case where the resistance between electrodes decreases due to a large amount of current shunting to the contact point, the current is increased in the state where the contact diameter of the parts to be welded is small. This results in a different heat generation pattern from that of the test welding, and raises the risk of expulsion.

(3) Even when the sheet gap between the metal sheets is small, an attempt to adjust the cumulative amount of heat generated to the cumulative amount of heat generated in the test welding in the case where the effect of current shunting is significant leads to a considerable increase of the current in the state where the current passage diameter between the metal sheets has not been secured. This causes marked heat generation not between the metal sheets but near interfaces between the electrodes and the metal sheets, and results in a large difference in heat generation pattern from the test welding.

(4) Once expulsion has occurred during welding due to the aforementioned disturbances such as a sheet gap or current shunting, molten metal splatters on the surroundings. Consequently, the sheet thickness of the weld decreases, and the voltage between electrodes decreases sharply. Hence, in the adaptive control welding, the instantaneous amount of heat generated per unit volume, which is calculated from the electrical property between the electrodes, decreases significantly, and such control that excessively increases the welding current or voltage in order to compensate for this will end up being performed. This facilitates further expulsion.

(5) We conducted more study to prevent further expulsion in the case where expulsion has occurred during welding.

We consequently discovered that further expulsion can be prevented to obtain a nugget of an appropriate diameter in the following manner: The current pattern is divided into two or more steps, to perform adaptive control welding. Moreover, a expulsion detector is provided. In the case where the detector detects expulsion during welding, the subsequent target amount of heat generated is reduced, and the current passage amount such as the welding current and the voltage between electrodes is adjusted based on the reduced target amount of heat generated.

(6) To newly set the target amount of heat generated after expulsion, typically the amount of heat generated needs to be recalculated while taking into account the sheet thickness decreased upon expulsion. However, it is very difficult to accurately monitor the decrease of the sheet thickness during welding.

We accordingly studied any alternative method of newly setting the target amount of heat generated after expulsion, and discovered that it is effective to reduce the subsequent target amount of heat generated depending on the degree of decrease in voltage between electrodes or resistance between electrodes upon expulsion detection.

The disclosure is based on the aforementioned discoveries and further studies.

We thus provide:

1. A resistance spot welding method of squeezing parts to be welded by a pair of electrodes, and passing a current while applying an electrode force to join the parts to be welded, the parts to be welded being a plurality of overlapping metal sheets, the resistance spot welding method comprising: performing test welding; and performing actual welding after the test welding, wherein in each of the test welding and the actual welding, a current pattern is divided into two or more steps, in the test welding, an amount of time variation of an instantaneous amount of heat generated per unit volume as a time variation curve and a cumulative amount of heat generated per unit volume are stored for each of the steps, both the amount of time variation and the cumulative amount of heat being calculated from an electrical property between the electrodes in the case of forming an appropriate nugget by passing a current by constant current control, and in the actual welding, the stored time variation curve and cumulative amount of heat generated of each of the steps are each used as a target and, adaptive control welding is performed to: in the case where a time variation of the instantaneous amount of heat generated per unit volume differs from the time variation curve in any of the steps, control a current passage amount in order to compensate for the difference within a remaining welding time in the step so that a cumulative amount of heat generated per unit volume in the actual welding matches the stored cumulative amount of heat generated; and, in the case where expulsion is detected in any of the steps, then in subsequent welding, reduce the cumulative amount of heat generated per unit volume used as the target and adjust the current passage amount in accordance with the reduced cumulative amount of heat generated per unit volume.

2. The resistance spot welding method according to 1., wherein Qs[T] is set in a range of the following expression in relation to Q0[T], Qf, and R:

$$Qf+(Q0[T]-Qf)\times(1-(5R/100))\leq Qs[T]\leq Qf+(Q0[T]-Qf)\times(1-(0.1R/100))$$

where Qs[T] in J is the cumulative amount of heat generated per unit volume in a welding time T used as the target after the detection of the expulsion. Q0[T] in J is the cumulative amount of heat generated per unit volume in the welding time T stored in the test welding, Qf in J is the cumulative amount of heat generated per unit volume until the detection of expulsion, and R in % is a rate of decrease in voltage between electrodes or resistance between electrodes per cycle at 50 Hz upon the detection of the expulsion.

3. The resistance spot welding method according to 1. or 2., wherein the expulsion is detected based on a change in any of voltage between electrodes, resistance between electrodes, distance between electrodes, servo torque of a welding gun, and strain of the welding gun.

Advantageous Effect

It is thus possible to, even when expulsion occurs during welding due to disturbances such as current shunting or a sheet gap, obtain a nugget of an appropriate diameter by preventing further expulsion.

DETAILED DESCRIPTION

Figure 1A:
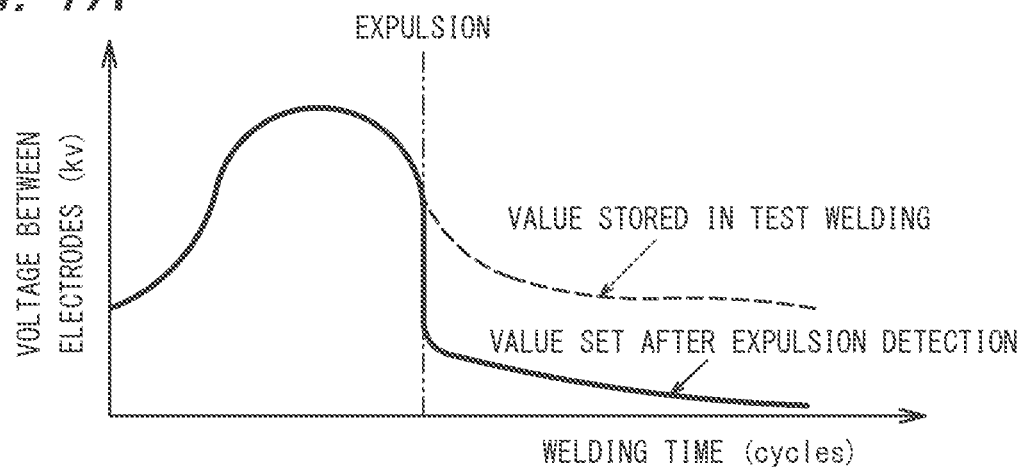
FIG. 1A is a diagram schematically illustrating an example of the relationship between the welding time and the voltage between electrodes according to one of the disclosed embodiments.

Detailed description is given below.

The disclosure relates to a resistance spot welding method of squeezing, by a pair of electrodes, parts to be welded which are a plurality of overlapping metal sheets, and passing a current while applying an electrode force to join the parts to be welded. The disclosure particularly relates to a suitable resistance spot welding method in the case of welding a sheet combination that is significantly affected by disturbances and is prone to expulsion and for which an appropriate welding condition is very limited, such as a sheet combination with a sheet thickness ratio ((the total thickness of the sheet combination)/(the sheet thickness of the thinnest metal sheet in the sheet combination)) of more than 3.0 or further 5.0 or more in which a thin sheet is overlapped on at least one face of two or more overlapping thick sheets. The upper limit of the sheet thickness ratio is not limited, but is typically 12.0.

Any welding device that includes a pair of upper and lower electrodes and is capable of freely controlling each of the electrode force and the welding current during welding may be used in the resistance spot welding method according to the disclosure. The force mechanism (air cylinder, servomotor, etc.), the type (stationary, robot gun, etc.), the electrode shape, and the like are not limited.

The term "thin sheet" means a metal sheet with relatively small sheet thickness and the term "thick sheet" means a metal sheet with relatively large sheet thickness, of the metal sheets used in the parts to be welded. Typically, the sheet thickness of the thin sheet is ¾ or less of that of the metal sheet (thick sheet) with the largest sheet thickness.

In the resistance spot welding method according to the disclosure, the current pattern in actual welding is divided into two or more steps to perform welding.

The point at which the current pattern is divided into steps may be set as appropriate depending on, for example, the material, sheet thickness, and number of overlapping metal sheets of the parts to be welded.

For example, in the case of welding a sheet combination with a sheet thickness ratio of more than 3.0 or further 5.0 or more in which a thin sheet is overlapped on at least one face of two or more overlapping thick sheets, nugget formation may be performed on one of the part between the thick sheets and the part between the thin and thick sheets in the first step and the other one of the part between the thick sheets and the part between the thin and thick sheets in the second step.

In the case of welding the parts to be welded which are made up of two metal sheets, the current pattern may be divided into a step of forming a stable current path (weld fusion zone) between the metal sheets and a step of subsequent nugget growth, in order to perform adaptive control welding highly responsive to changes in phenomenon during welding. In the case where the parts to be welded are coated steel sheets, the welding process may be divided into three steps of: a step of melting the coating to rapidly expand the current conducting area; a step of forming a stable current path (weld fusion zone) between the electrodes by subsequent current passage; and a step of subsequent nugget growth.

The magnitude relationship between the welding currents in the respective steps is not limited. A cooling time may be provided between the steps.

Before the actual welding, test welding is performed with the current pattern being divided into steps at the same point as in the actual welding. In the test welding, the amount of time variation of the instantaneous amount of heat generated per unit volume as a time variation curve and the cumulative amount of heat generated per unit volume are stored for each of the steps, where both the amount of time variation and the cumulative amount of heat are calculated from the electrical property between the electrodes in the case of forming an appropriate nugget by passing a current by constant current control.

For the test welding, a welding test with the same steel type and thickness as the parts to be welded is performed by constant current control under various conditions in the state where there is no current shunting to an existing weld or sheet gap, to find an optimal condition in the test welding. Then, for each step, the time variation of the instantaneous amount of heat generated per unit volume is stored as a time variation curve, and the cumulative amount of heat generated per unit volume is stored. Both the time variation and the cumulative amount are calculated from the electrical property between the electrodes during the welding performed under the aforementioned condition. The electrical property between the electrodes means the resistance between electrodes or the voltage between electrodes.

After the test welding, the actual welding is performed. In the actual welding, the time variation curve stored in the test welding for each step is used as a target. If the time variation of the instantaneous amount of heat generated per unit volume follows the stored time variation curve, the welding is continued without change and completed. If the time variation of the instantaneous amount of heat generated per unit volume differs from the stored time variation curve, on the other hand, the adaptive control welding of controlling the current passage amount depending on the difference is carried out to compensate for the difference within the remaining welding time of the step so that the cumulative amount of heat generated per unit volume in the actual welding matches the stored cumulative amount of heat generated per unit volume in the test welding.

Thus, the required cumulative amount of heat generated can be ensured to obtain an appropriate nugget diameter even in the state where the effects of disturbances such as electrode tip wear, current shunting, or a sheet gap are significant.

The disturbances mentioned here include not only the presence of an existing weld or a contact point of the parts to be welded near the current welding point, but also electrode wear.

The method of calculating the cumulative amount of heat generated per unit volume is not limited. PTL 3 describes an example of the method, which may be used in this disclosure. The following is the procedure of calculating the cumulative amount Q of heat generated per unit volume according to this method.

Let t be the total thickness of the parts to be welded, r be the electrical resistivity of the parts to be welded, V be the voltage between electrodes, I be the welding current, and S be the contact area of the electrodes and the parts to be welded. In this case, the welding current passes through a columnar portion whose cross-sectional area is S and thickness is t, to generate heat by resistance. The amount q of heat generated per unit volume and per unit time in the columnar portion is given by the following Equation (1):

$$q=(V \cdot I)/(S \cdot t) \tag{1}$$

The electrical resistance R' of the columnar portion is given by the following Equation (2):

$$R'=(r \cdot t)/S \tag{2}$$

Solving Equation (2) for S and substituting the solution into Equation (1) yields the amount q of heat generated as indicated by the following Equation (3):

$$q=(V \cdot I \cdot R')/(r \cdot t^2)=(V^2)/(r \cdot t^2) \tag{3}$$

As is clear from Equation (3), the amount q of heat generated per unit volume and per unit time can be calculated from the voltage between electrodes V, the total thickness t of the parts to be welded, and the electrical resistivity r of the parts to be welded, and is not affected by the contact area S of the electrodes and the parts to be welded. Although the amount of heat generated is calculated from the voltage between electrodes V in Equation (3), the amount q of heat generated may be calculated from the interelectrode current I. The contact area S of the electrodes and the parts to be welded need not be used in this case, either. By cumulating the amount q of heat generated per unit volume and per unit time for the welding time, the cumulative amount Q of heat generated per unit volume for the welding is obtained. As is clear from Equation (3), the cumulative amount Q of heat generated per unit volume can also be calculated without using the contact area S of the electrodes and the parts to be welded.

Although the above describes the case of calculating the cumulative amount Q of heat generated by the method described in PTL 3, the cumulative amount Q may be calculated by any other method.

Figure 1B:
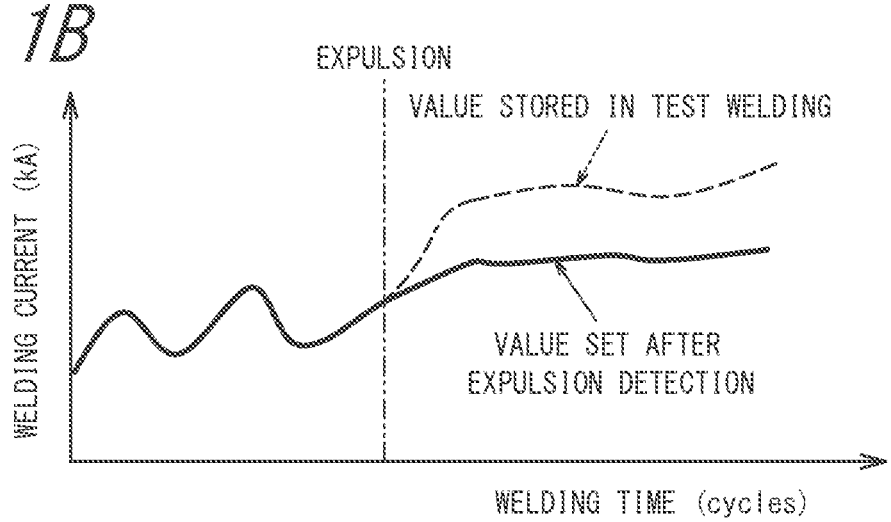
FIG. 1B is a diagram schematically illustrating an example of the relationship between the welding time and the welding current according to one of the disclosed embodiments.
Figure 1C:
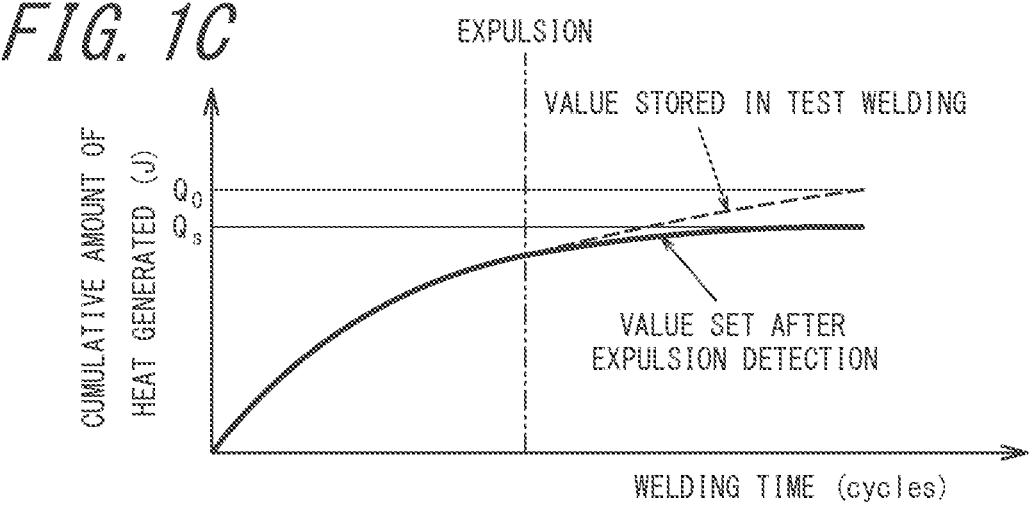
FIG. 1C is a diagram schematically illustrating an example of the relationship between the welding time and the cumulative amount of heat generated according to one of the disclosed embodiments.

In the resistance spot welding method according to the disclosure, it is very important to, in the case where expulsion is detected in any of the steps, then in subsequent welding, reduce the cumulative amount of heat generated per unit volume used as the target and adjust the current passage amount, i.e. the welding current and the voltage between electrodes, in accordance with the reduced cumulative amount of heat generated per unit volume, as illustrated in FIGS. 1A to 1C.

Once expulsion has occurred during welding, molten metal splatters on the surroundings. Consequently, the sheet thickness of the weld decreases, and the voltage between electrodes decreases sharply. If welding is continued using, as the target, the time variation of the instantaneous amount of heat generated per unit volume and the cumulative amount of heat generated per unit volume that are stored in the test welding, such control that excessively increases the welding current or the voltage between electrodes will end up being performed. This facilitates further expulsion.

Hence, in the resistance spot welding method according to the disclosure, in the case where expulsion is detected in any of the steps, then in subsequent welding, the cumulative amount of heat generated per unit volume used as the target is reduced, and the current passage amount, i.e. the welding current and the voltage between electrodes, is adjusted in accordance with the reduced cumulative amount of heat generated per unit volume.

The reason why the desired nugget diameter can be obtained even when the target of the cumulative amount of heat generated per unit volume is reduced appears to be as follows: The sheet thickness of the weld decreases due to expulsion, and as a result the amount of heat that needs to be generated to obtain the desired nugget diameter decreases, too.

Regarding the method of newly setting the target of the cumulative amount of heat generated per unit volume after expulsion, for example, $Qs[T]$ is preferably set in the range of the following expression in relation to $Q0[T]$, $Qf$, and $R$:

$$Qf+(Q0[T]-Qf)\times(1-(5R/100))\leq Qs[T]\leq Qf+(Q0[T]-Qf)\times(1-(0.1R/100))$$

where $Qs[T]$ (J) is the cumulative amount of heat generated per unit volume in welding time T newly used as the target after the detection of expulsion, $Q0[T]$ (J) is the cumulative amount of heat generated per unit volume in the welding time T stored in the test welding, $Qf$ (J) is the cumulative amount of heat generated per unit volume until the detection of expulsion, and $R$ (%) is the rate of decrease in voltage between electrodes or resistance between electrodes per cycle (50 Hz (hereafter all time units are expressed by the number of cycles at 50 Hz)) upon expulsion.

By setting the target of the cumulative amount of heat generated in this range, even in the case where expulsion is detected during welding, a nugget of the desired diameter corresponding to the sheet thickness of the weld after expulsion can be obtained without further expulsion. The welding time T mentioned here is the time elapsed from when the current passage starts.

$Qs[T]$ is more preferably set in the range of the following expression in relation to $Q0[T]$, $Qf$, and $R$:

$$Qf+(Q0[T]-Qf)\times(1-(4R/100))\leq Qs[T]\leq Qf+(Q0[T]-Qf)\times(1-(0.3R/100)).$$

$Qs[T]$ is further preferably set in the range of the following expression in relation to $Q0[T]$, $Qf$, and $R$:

$$Qf+(Q0[T]-Qf)\times(1-(3R/100))\leq Qs[T]\leq Qf+(Q0[T]-Qf)\times(1-(0.5R/100)).$$

In the aforementioned respective expressions, the left side of the expression is $Qf$ or less in the following cases:

$$Qf<Qs[T]\leq Qf+(Q0[T]-Qf)\times(1-(0.1R/100))$$

$$Qf<Qs[T]\leq Qf+(Q0[T]-Qf)\times(1-(0.3R/100))$$

$$Qf<Qs[T]\leq Qf+(Q0[T]-Qf)\times(1-(0.5R/100)).$$

The time variation curve of the instantaneous amount of heat generated per unit volume is corrected according to the correction of the target of the cumulative amount of heat generated per unit volume, at the same ratio as the correction of the cumulative amount of heat generated.

As the expulsion detector, the following technique may be used.

When expulsion occurs, the voltage between electrodes and the resistance between electrodes decrease due to a decrease in sheet thickness of the weld. Accordingly, a technique of recognizing the occurrence of expulsion when the rate of decrease R in voltage between electrodes or resistance between electrodes per cycle (50 Hz) exceeds a predetermined threshold may be used as an example. The threshold is preferably 10% to 30%, in terms of distinguishing the decrease from changes in voltage between electrodes or resistance between electrodes in normal adaptive control.

Even in the case where expulsion occurs, the maximum value of the rate of decrease R in voltage between electrodes or resistance between electrodes per cycle (50 Hz) is typically 50%.

The distance between electrodes also decreases sharply due to a decrease in sheet thickness associated with expulsion, and so may be equally used for the expulsion detector.

When expulsion occurs, the reaction force of the steel sheet to the electrode force of the electrode decreases sharply. An attempt to maintain the set electrode force in such a state causes the electrode force to significantly change temporarily, due to a delay in response of an electrode force control device. This may be equally used for the expulsion detector. The method of measuring the electrode force is not limited, and the electrode force may be measured based on the torque of the servomotor of a welding gun, the strain of the welding gun, or the like.

Figure 2:
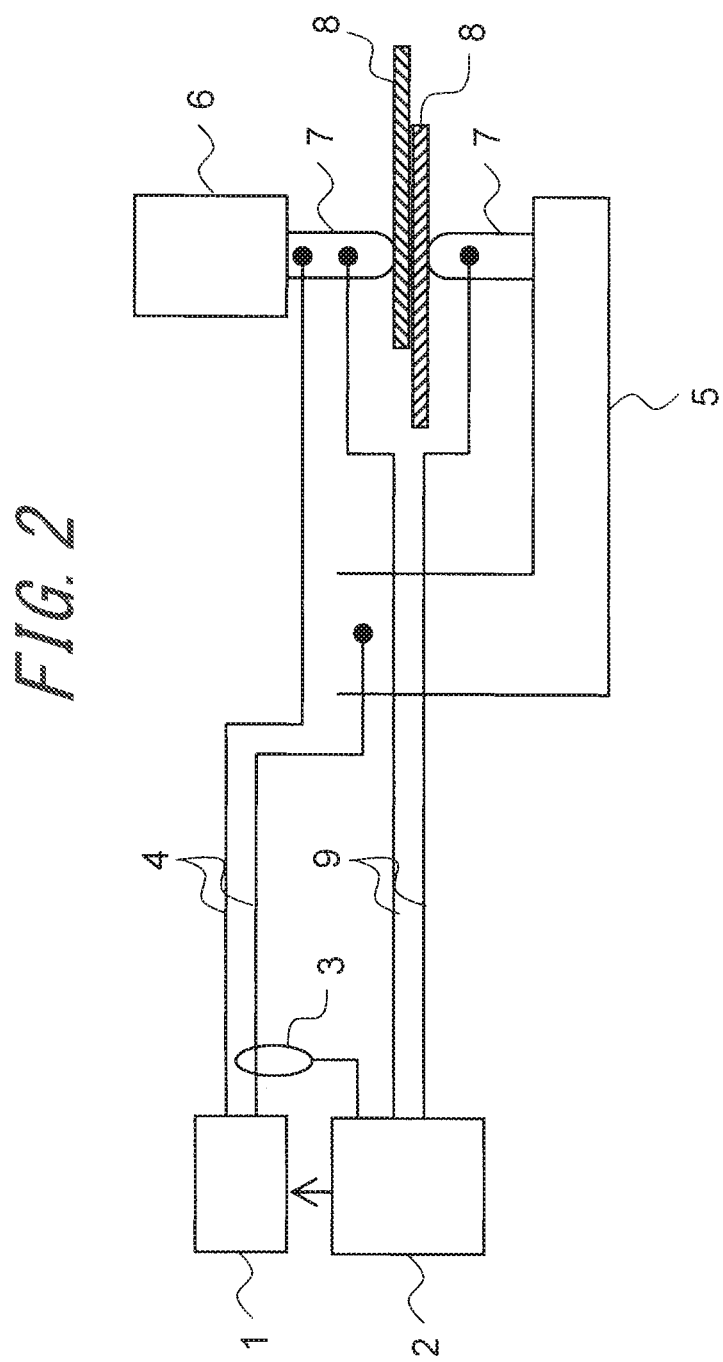
FIG. 2 is a diagram schematically illustrating an example of a resistance spot welding device.

FIG. 2 is a schematic diagram illustrating an example of the structure of a resistance spot welding device suitable for the resistance spot welding method according to the disclosure.

In FIG. 2, reference sign 1 is a resistance spot welding power source, 2 is a controller that provides a control signal to the resistance spot welding power source 1, 3 is a welding current detector that outputs a detected signal to the controller 2, and 4 is a secondary conductor connected to the output of the resistance spot welding power source 1 and also connected to electrodes 7 to pass a current to the electrodes 7. Reference sign 5 is a lower arm and 6 is a force cylinder, which are attached to the respective electrodes 7. The electrodes 7 squeeze parts to be welded 8. Reference sign 9 is a voltage between electrodes detection line attached to the electrodes 7, and connected to the controller 2. The controller 2 can switch between a test welding mode and an actual welding mode.

In the test welding mode, the controller 2 calculates the instantaneous amount of heat from the current received from the welding current detector 3 and the voltage received from the voltage between electrodes detection line 9, and stores the amount of time variation of the instantaneous amount of heat generated.

In the actual welding mode, having started current passage under the welding condition of the test welding, the controller 2 calculates, per sampling time, the instantaneous amount of heat generated from the current received from the welding current detector 3 and the voltage received from the voltage between electrodes detection line 9. The controller 2 then compares the instantaneous amount of heat generated in the actual welding and the stored instantaneous amount of heat generated in the test welding, per unit time. When the two values differ from each other, adaptive control welding of controlling the welding current depending on the difference is performed. Thus, the welding current adaptively controlled by the controller 2 is passed through the parts to be welded 8 so that the cumulative amount of heat generated in the actual welding matches the stored cumulative amount of heat generated in the test welding.

In the case where expulsion is detected from, for example, a sharp decrease of the voltage received from the voltage between electrodes detection line 9, the controller 2 newly sets, as the target, the cumulative amount of heat generated stored in the test welding, and adjusts the current passage amount, i.e. the welding current and the voltage between electrodes, based on the newly set cumulative amount of heat generated.

The magnitude relationship of each condition such as electrode force or welding time between the steps is not limited, and may be set as appropriate depending on, for example, the material, sheet thickness, and number of overlapping metal sheets of the parts to be welded.

For example, suppose, when welding a sheet combination with a sheet thickness ratio of more than 3.0 or further 5.0 or more in which a thin sheet is overlapped on at least one face of two or more overlapping thick sheets, the part between the thick sheets is molten in the first step and the part between the thin and thick sheets is molten in the second step. Then, the electrode force F1 (kN) in the first step and the electrode force F2 (kN) in the second step preferably satisfy the relationship F1>F2. Further preferably, the welding times T1 and T2 in the first and second steps are 5 cycles to 50 cycles and 1 cycle to 20 cycles, respectively. In this case, a cooling time of 1 cycle or more and 100 cycles or less is preferably provided between the current passage in the first step and the current passage in the second step, in terms of preventing expulsion in the second step.

The metal sheets as the parts to be welded in the resistance spot welding method according to the disclosure are not limited. The resistance spot welding method may be used for the welding of steel sheets and coated steel sheets having various strengths from mild steel to ultra high tensile strength steel and light metal sheets of aluminum alloys and the like. The resistance spot welding method may also be used for a sheet combination of four or more overlapping steel sheets.

Examples

Figure 3A:
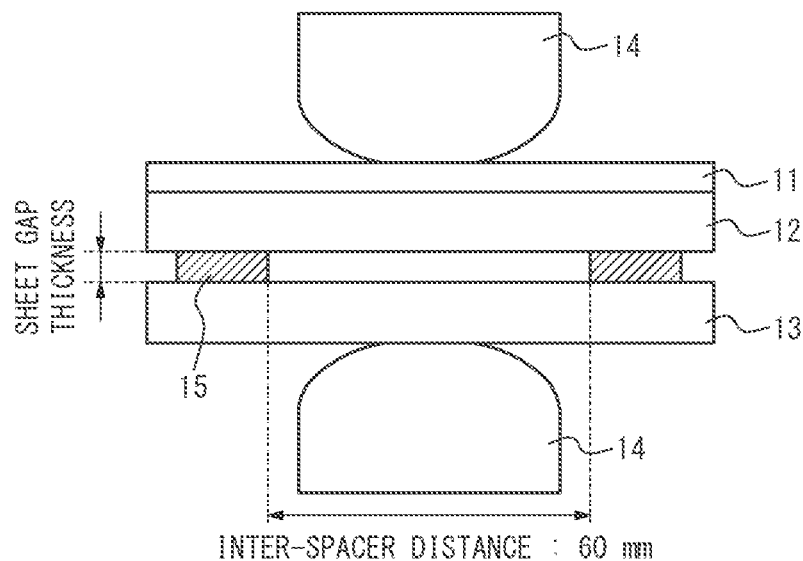
FIG. 3A is a diagram schematically illustrating the case of welding a sheet combination of three sheets having a sheet gap according to one of the disclosed embodiments.
Figure 3B:
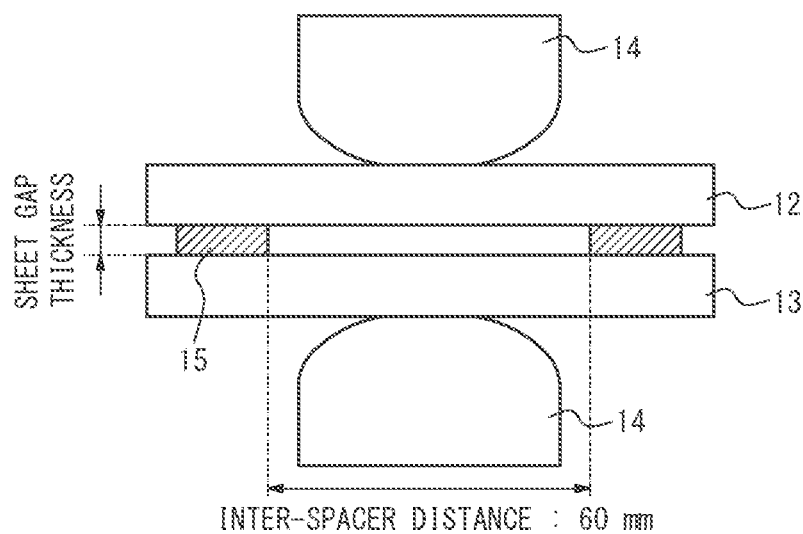
FIG. 3B is a diagram schematically illustrating the case of welding a sheet combination of two sheets having a sheet gap according to one of the disclosed embodiments.

For each sheet combination of two or three overlapping metal sheets listed in Table 1 and illustrated in FIGS. 3A and 3B, resistance spot welding was performed under each condition listed in Table 2 to produce a joint. In the drawings, reference sign 11 is a metal sheet (thin sheet), 12 and 13 are each a metal sheet (thick sheet), 14 is an electrode, and 15 is a spacer.

The result in the case where the control mode is "adaptive control (without expulsion correction)" in Table 2 indicates the result of, after performing test welding in the absence of disturbances such as a sheet gap under the welding condition in Table 2 and storing the time variation of the instantaneous amount of heat generated per unit volume, performing adaptive control spot welding of adjusting the current with reference to the time variation curve of the instantaneous amount of heat generated per unit volume obtained in the test welding regardless of whether or not expulsion occurred. The result in the case where the control mode is "adaptive control (with expulsion correction)" in Table 2 indicates the result of, when the rate of decrease in voltage between electrodes per unit time exceeded a threshold (20%), determining that expulsion occurred, and, in subsequent welding, reducing the cumulative amount of heat generated per unit volume used as the target, as presented in Table 2, based on the rate of decrease in voltage between electrodes or resistance between electrodes per cycle upon expulsion detection, and adjusting the current passage amount in accordance with the reduced cumulative amount of heat generated per unit volume. The conditions such as welding time and electrode force were the same in the test welding and the actual welding.

As illustrated in FIGS. 3A and 3B, the spacers 15 (inter-spacer distance: 60 mm) were inserted between the thick sheets 12 and 13, and the sheet combination was clamped from above and below (not illustrated), to create a sheet gap of any of various sheet gap thicknesses.

An inverter DC resistance spot welder was used as the welder, and chromium copper electrodes with 6 mm face diameter DR-shaped tips were used as the electrodes.

For each obtained joint, the weld was cut and etched in section, and then observed with an optical microscope to measure each of the nugget diameter d1 (mm) between the thin and thick sheets and the nugget diameter d2 (mm) between the thick sheets. Each sample in which the nugget diameters d1 and d2 were both $4\sqrt{t'}$ or more (t': the sheet thickness (mm) of the thinner metal sheet of the adjacent two metal sheets) and the minimum thickness of the weld was 40% or more of the total thickness of the sheet combination before welding was evaluated as good. Each sample in which any of the nugget diameters d1 and d2 was less than $4\sqrt{t'}$ or the minimum thickness of the weld was less than 40% of the total thickness of the sheet combination before welding was evaluated as poor.

TABLE 1

| Sheet combination No. | Metal sheet (thin sheet) of reference sign 11 in the drawings | Metal sheet (thick sheet) of reference sign 12 in the drawings | Metal sheet (thick sheet) of reference sign 13 in the drawings | Sheet thickness ratio |
|---|---|---|---|---|
| A | 270 MPa-grade cold rolled steel sheet (sheet thickness: 0.7 mm) | 980 MPa-grade cold rolled steel sheet (sheet thickness: 2.0 mm) | 980 MPa-grade cold rolled steel sheet (sheet thickness: 2.0 mm) | 6.7 |
| B | 270 MPa-grade GA steel sheet (sheet thickness: 0.7 mm) | 780 MPa-grade GA steel sheet (sheet thickness: 1.6 mm) | 780 MPa-grade GA steel sheet (sheet thickness: 1.6 mm) | 5.6 |
| C | 270 MPa-grade GA steel sheet (sheet thickness: 0.7 mm) | 590 MPa-grade GA steel sheet (sheet thickness: 1.0 mm) | 590 MPa-grade GA steel sheet (sheet thickness: 1.0 mm) | 3.9 |
| D | | 980 MPa-grade cold rolled steel sheet (sheet thickness: 2.0 mm) | 980 MPa-grade cold rolled steel sheet (sheet thickness: 2.0 mm) | 2.0 |

TABLE 2

| Joint No. | Sheet combination No. | First step Electrode force F1 (kN) | First step Welding current I1 (kA) | First step Welding time T1 (cycles) | Cooling time Tc (cycles) | Second step Electrode force F2 (kN) | Second step Welding current I2 (kA) | Second step Welding time T2 (cycles) | Control mode | Sheet gap thickness | Expulsion detection | R*1 (%) | Qs[T]*2 (J) | Qf + (Q0[T]*3 − Qf) | Evaluation | Remarks |
|---|---|---|---|---|---|---|---|---|---|---|---|---|---|---|---|---|
| 1 | A | 3.5 | 8.0 | 20 | 50 | 1.0 | 10.5 | 5 | Adaptive control (with expulsion correction) | 1.5 mm | First step: detected Second step: not detected | 20 | — | Qf + (Q0[T]*3 − Qf) × 0.8 | Good | Example |
| 2 | A | 5.0 | 7.0 | 20 | 50 | 1.0 | 10.5 | 5 | Adaptive control (with expulsion correction) | 0.5 mm | Not detected | — | — | — | Good | Reference Example |
| 3 | A | 5.0 | 7.0 | 20 | 50 | 1.0 | 10.5 | 5 | Adaptive control (with expulsion correction) | 1.0 mm | Not detected | — | — | — | Good | Reference Example |
| 4 | B | 3.0 | 6.5 | 15 | 15 | 1.5 | 10.0 | 4 | Adaptive control (with expulsion correction) | 1.5 mm | First step: detected Second step: not detected | 25 | — | Qf + (Q0[T]*3 − Qf) × 0.7 | Good | Example |
| 5 | C | 3.0 | 9.5 | 8 | — | 3.0 | 7.0 | 10 | Adaptive control (with expulsion correction) | 1.5 mm | First step: detected Second step: not detected | 23 | — | Qf + (Q0[T]*3 − Qf) × 0.85 | Good | Example |
| 6 | D | 3.5 | 8.0 | 7 | — | 3.5 | 8.5 | 16 | Adaptive control (with expulsion correction) | 1.5 mm | First step: detected Second step: not detected | 25 | — | Qf + (Q0[T]*3 − Qf) × 0.75 | Good | Example |
| 7 | A | 3.5 | 8.0 | 20 | 50 | 1.0 | 10.5 | 5 | Adaptive control (without expulsion correction) | 1.5 mm | First step: detected Second step: not detected | — | — | — | Poor sheet thickness decrease | Comparative Example |
| 8 | C | 3.0 | 9.5 | 8 | — | 3.0 | 7.0 | 10 | Adaptive control (without expulsion correction) | 1.5 mm | First step: detected Second step: not detected | — | — | — | Poor sheet thickness decrease | Comparative Example |
| 9 | A | 3.5 | 8.0 | 20 | — | — | — | — | Adaptive control (without expulsion correction) | 1.5 mm | First step: detected | — | — | — | Poor sheet thickness decrease | Comparative Example |
| 10 | D | 3.5 | 8.0 | 16 | — | — | — | — | Adaptive control (without expulsion correction) | 1.5 mm | First step: detected | — | — | — | Poor sheet thickness decrease | Comparative Example |

*1 Rate of decrease in voltage between electrodes or resistance between electrodes per cycle (50 Hz) upon expulsion detection.
*2 Cumulative amount of heat generated per unit volume in welding time T used as the target after expulsion detection.
*3 Cumulative amount of heat generated per unit volume in welding time T stored in test welding.

In Examples, the minimum thickness of the weld was sufficient, and a nugget with a diameter of 4√t' or more was obtained between the thin and thick sheets and between the thick sheets. In Reference Examples with small sheet gap thicknesses, a nugget with a diameter of 4'√t' or more was obtained between the thin and thick sheets and between the thick sheets, without detecting expulsion during the process.

In all Comparative Examples, on the other hand, the minimum thickness of the weld was insufficient.

REFERENCE SIGNS LIST 1 resistance spot welding power source
2 controller that provides control signal to resistance spot welding power source
3 welding current detector
4 secondary conductor connected to output of resistance spot welding power source
5 lower arm
6 force cylinder
7 electrode
8 part to be welded
9 voltage between electrodes detection line
11 metal sheet (thin sheet)
12, 13 metal sheet (thick sheet)
14 electrode
15 spacer

The invention claimed is:

1. A resistance spot welding method of squeezing parts to be welded by a pair of electrodes, and passing a current while applying an electrode force to join the parts to be welded, the parts to be welded being a plurality of overlapping metal sheets, the resistance spot welding method comprising:
performing test welding; and
performing actual welding after the test welding,
wherein in each of the test welding and the actual welding, a current pattern is divided into two or more steps,
in the test welding, an amount of time variation of an instantaneous amount of heat generated per unit volume as a time variation curve and a cumulative amount of heat generated per unit volume are stored for each of the steps, both the amount of time variation and the cumulative amount of heat being calculated from an electrical property between the electrodes in the case of forming an appropriate nugget by passing a current by constant current control,
in the actual welding, the stored time variation curve and cumulative amount of heat generated of each of the steps are each used as a target and, adaptive control welding is performed to: in the case where a time variation of the instantaneous amount of heat generated per unit volume differs from the time variation curve in any of the steps, control a current passage amount in order to compensate for the difference within a remaining welding time in the step so that a cumulative amount of heat generated per unit volume in the actual welding matches the stored cumulative amount of heat generated in the test welding; and, in the case where expulsion is detected in any of the steps, then in subsequent welding, reduce the cumulative amount of heat generated per unit volume used as the target and adjust the current passage amount in accordance with the reduced cumulative amount of heat generated per unit volume, and $Qs[T]$ is set in a range of the following expression in relation to $Q0[T]$, $Qf$, and $R$:

$$Qf+(Q0[T]-Qf)\times(1-(5R/100))\leq Qs[T]\leq Qf+(Q0[T]-Qf)\times(1-(0.1R/100))$$

where $Qs[T]$ in J is the cumulative amount of heat generated per unit volume in a welding time T used as the target after the detection of the expulsion, $Q0[T]$ in J is the cumulative amount of heat generated per unit volume in the welding time T stored in the test welding, $Qf$ in J is the cumulative amount of heat generated per unit volume until the detection of expulsion, and $R$ in % is a rate of decrease in voltage between electrodes or resistance between electrodes per cycle at 50 Hz upon the detection of the expulsion.

2. The resistance spot welding method according to claim 1, wherein the expulsion is detected based on a change in any of voltage between electrodes, resistance between electrodes, distance between electrodes, servo torque of a welding gun, and strain of the welding gun.

* * * * *